United States Patent
Stochel et al.

(10) Patent No.: US 11,023,988 B2
(45) Date of Patent: *Jun. 1, 2021

(54) METHOD, DEVICE, AND SYSTEM FOR TRIGGERING AND PROPAGATING OF A COVERT MODE STATUS CHANGE

(71) Applicant: MOTOROLA SOLUTIONS, INC, Chicago, IL (US)

(72) Inventors: Marek G. Stochel, Gaj (PL); Adrian Stanislaw Dybczak, Cracow (PL); Maciej Bartlomiej Fabis, Cracow (PL); Miroslaw Gwizdz, Cracow (PL); Wojciech Jan Kucharski, Rzeszow (PL); Dawid Przybylski, Cracow (PL); Gregorz Adam Szurek, Cracow (PL); Witold Wachala, Niepolomice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 341 days.

This patent is subject to a terminal disclaimer.

(21) Appl. No.: 15/776,888

(22) PCT Filed: Mar. 16, 2016

(86) PCT No.: PCT/PL2016/050006
§ 371 (c)(1),
(2) Date: May 17, 2018

(87) PCT Pub. No.: WO2017/160171
PCT Pub. Date: Sep. 21, 2017

(65) Prior Publication Data
US 2020/0258180 A1     Aug. 13, 2020

(51) Int. Cl.
*G06Q 50/26*     (2012.01)
*H04W 4/90*     (2018.01)
(Continued)

(52) U.S. Cl.
CPC ............. *G06Q 50/265* (2013.01); *G08B 7/06* (2013.01); *H04W 4/90* (2018.02); *H04W 68/005* (2013.01); *H04W 76/32* (2018.02)

(58) Field of Classification Search
CPC combination set(s) only.
See application file for complete search history.

(56) References Cited

U.S. PATENT DOCUMENTS 7,630,323 B2   12/2009  Bridgelall
8,695,078 B2    4/2014  Low et al.
(Continued)

OTHER PUBLICATIONS

C. L. Smith, "Trends in covert applications of electrotechnology," in IEEE Technology and Society Magazine, vol. 10, No. 2, pp. 15-21, Summer 1991, doi: 10.1109/44.81933. (Year: 1991).*

(Continued)

*Primary Examiner* — Gabrielle A McCormick
*Assistant Examiner* — Maame Ofori-Awuah

(57) ABSTRACT

A process for triggering and propagating a covert mode status change includes maintaining one or more first devices having externally-perceivable outputs in a covert state in which one or more indications of law enforcement activity are caused to be hidden or inactivated. In response to subsequently detecting a covert mode status change trigger, causing the one or more externally-perceivable outputs to switch from the covert state to the non-covert state when the covert mode status change trigger is detected and causing, by the computing device, the one or more externally-perceivable outputs to switch from the non-covert state to the covert state when the covert mode status change trigger is detected and transmitting via one or more networks a covert mode status change trigger message to a second computing device maintaining one or more second devices having second externally-perceivable outputs to switch from the covert state to the non-covert state.

20 Claims, 6 Drawing Sheets

(51) Int. Cl.
*H04W 76/32* (2018.01)
*G08B 7/06* (2006.01)
*H04W 68/00* (2009.01)

(56) References Cited

U.S. PATENT DOCUMENTS

| | | | |
|---|---|---|---|
| 8,787,941 | B2 | 7/2014 | Kushtagi et al. |
| 8,871,327 | B2* | 10/2014 | Tsai ................... F41H 3/02 |
| | | | 428/137 |
| 8,984,073 | B2 | 3/2015 | Tan |
| 2008/0095097 | A1 | 4/2008 | Mehta et al. |
| 2008/0293374 | A1* | 11/2008 | Berger ................ H04M 11/04 |
| | | | 455/404.2 |
| 2009/0310290 | A1 | 12/2009 | Tennent |
| 2009/0325566 | A1 | 12/2009 | Bell et al. |
| 2012/0033081 | A1* | 2/2012 | Smith ............... H04M 1/72577 |
| | | | 348/151 |
| 2012/0204307 | A1 | 8/2012 | De Mattei et al. |
| 2014/0098206 | A1 | 4/2014 | Rosella et al. |
| 2014/0364131 | A1 | 12/2014 | Luna et al. |
| 2015/0061492 | A1* | 3/2015 | Braunberger .......... B60K 31/00 |
| | | | 315/82 |
| 2017/0034680 | A1* | 2/2017 | Yoakum ................ G04G 21/06 |

OTHER PUBLICATIONS

The International Search Report and the Written Opinion, corresponding serial No. PCT/PL2016/050006 filed Mar. 16, 2016, all pages.

* cited by examiner

METHOD, DEVICE, AND SYSTEM FOR TRIGGERING AND PROPAGATING OF A COVERT MODE STATUS CHANGE

This application is a National Stage filing under 35 USC § 371 of co-pending Patent Cooperation Treaty international application having Serial No. PCT/PL16/50006 (the 'PCT international application') filed on Mar. 16, 2016. This application claims priority to the PCT international application, the entire contents of which are incorporated herein by reference.

BACKGROUND OF THE INVENTION

Many public safety operations rely upon the element of stealth or surprise while others rely upon visibility to provide an identification or deterrent effect. Accordingly, public safety teams may operate in a "covert mode" in which they attempt to conceal their membership in a public safety organization by, e.g., hiding or covering one or more externally-perceivable indications of law enforcement activity. For example, police officers may dress themselves in 'plain-clothes' outfits or drive un-marked vehicles.

In other situations, public safety teams may operate in a "non-covert mode" for ease in identifying friendly forces or for increased deterrent effects. For example, police officers may dress in formal police attire that is adorned with text, badges, or other markings identifying the wearer as a police officer. Similarly, vehicles may be adorned with lights, colors, text, signage, speakers, etc. that clearly identify the vehicle as a police vehicle.

However, there exists a need for an improved method, device, and system for propagating a covert mode status change in order to more intelligently change a covert mode and propagate that change among other devices.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
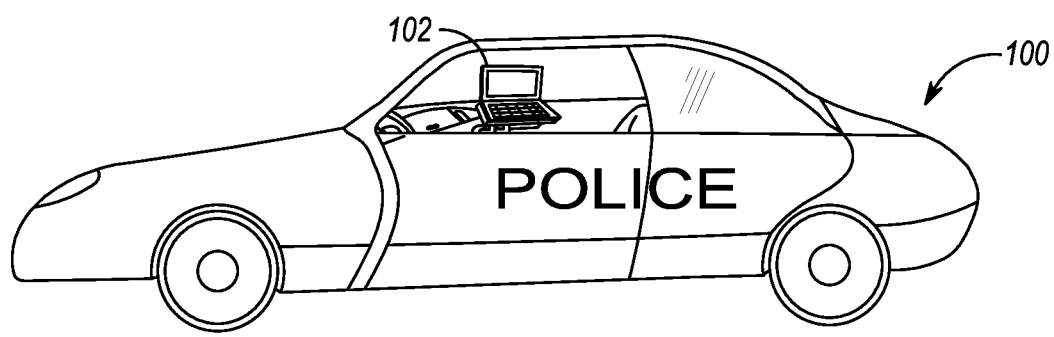
FIG. 1A is a system diagram illustrating a police vehicle having a computing device communicatively coupled to externally-perceivable outputs in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for triggering and propagating a covert mode status change among other devices.

In one embodiment, a method for triggering and propagating a covert mode status change includes: maintaining, by a computing device, one or more first devices each having an externally-perceivable output in one of a covert state in which one or more indications of law enforcement activity are caused to be hidden or inactivated via the externally-perceivable output and a non-covert state in which the one or more indications of law enforcement activity are caused to be revealed or activated via the externally-perceivable output; detecting, by the computing device, a covert mode status change trigger; one of causing, by the computing device, the one or more externally-perceivable outputs to switch from the covert state to the non-covert state when the covert mode status change trigger is detected and causing, by the computing device, the one or more externally-perceivable outputs to switch from the non-covert state to the covert state when the covert mode status change trigger is detected; and transmitting, by the computing device via one or more of a personal area network (PAN), vehicle area network (VAN), local area network (LAN), wide-area-network (WAN), ad-hoc network (AHN), or disruption tolerant network (DTN) communicatively coupled to the computing device, a covert mode status change trigger message to a second computing device maintaining one or more second devices each having a second externally-perceivable output to one of switch from the covert state to the non-covert state and switch from the non-covert state to the covert state.

In a further embodiment, a computing device for triggering and propagating of a covert mode status change includes: one or more transceivers communicatively coupled to one or more of a personal area network (PAN), vehicle area network (VAN), local area network (LAN), wide-area-network (WAN), ad-hoc network (AHN), or disruption tolerant network (DTN); a data store; and one or more electronic processors configured to: maintain one or more first devices each having an externally-perceivable output in one of a covert state in which one or more indications of law enforcement activity are caused to be hidden or inactivated via the externally-perceivable output and a non-covert state in which the one or more indications of law enforcement activity are caused to be revealed or activated via the externally-perceivable output; detect a covert mode status change trigger; one of cause the one or more externally-perceivable outputs to switch from the covert state to the non-covert state when the covert mode status change trigger is detected and cause the one or more externally-perceivable outputs to switch from the non-covert state to the covert state when the covert mode status change trigger is detected; and transmit, via the one or more transceivers, a covert mode status change trigger message to a second computing device maintaining one or more second devices each having a second externally-perceivable output to one of switch from the covert state to the non-covert state and switch from the non-covert state to the covert state.

In a still further embodiment, a non-transitory computer readable media stores instructions that, when executed by a processor, perform a set of functions for triggering and propagating of a covert mode status change, the set of functions including: maintaining one or more first devices each having an externally-perceivable output in one of a covert state in which one or more indications of law enforcement activity are caused to be hidden or inactivated via the externally-perceivable output and a non-covert state in which the one or more indications of law enforcement activity are caused to be revealed or activated via the externally-perceivable output; detecting a covert mode status change trigger; one of causing the one or more externally-perceivable outputs to switch from the covert state to the non-covert state when the covert mode status change trigger is detected and causing the one or more externally-perceivable outputs to switch from the non-covert state to the covert state when the covert mode status change trigger is detected; and transmitting, via one or more of a personal area network (PAN), vehicle area network (VAN), local area network (LAN), wide-area-network (WAN), ad-hoc network (AHN), or disruption tolerant network (DTN) communicatively coupled to the computing device, a covert mode status change trigger message to a second computing device maintaining one or more second devices each having a second externally-perceivable output to one of switch from the covert state to the non-covert state and switch from the non-covert state to the covert state.

Each of the above-mentioned embodiments will be discussed in more detail below, starting with example device and network architectures of the system in which the embodiments may be practiced, followed by an illustration of processing steps for triggering and propagating a covert mode status change among other devices. Further advantages and features consistent with this disclosure will be set forth in the following detailed description, with reference to the figures.

1. Device and System Structure

Figure 1B:
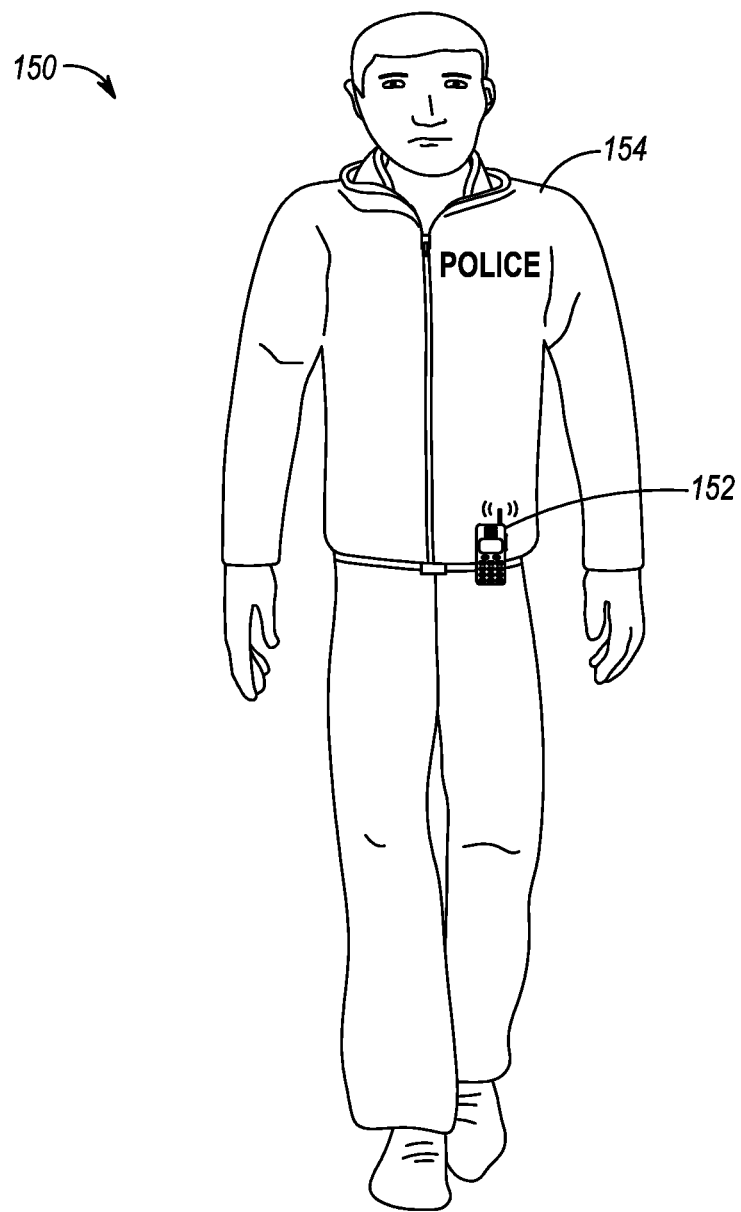
FIG. 1B is a system diagram illustrating a police officer having a computing device communicatively coupled to a clothing having externally-perceivable outputs in accordance with some embodiments.

Referring now to the drawings, and in particular FIGS. 1A and 1B, example personal and automotive computing devices are disclosed for enabling a more intelligent triggering and propagation of a covert mode status change across devices. As set forth in FIG. 1A, a police vehicle 100 may include an automotive computing device 102 for controlling a covert state of the police vehicle 100 and propagating a covert mode status change to other devices. While a laptop computer is illustrated as the automotive computing device 102 in the example set forth in FIG. 1A, in other embodiments, other types of computing devices could be used, including but not limited to tablet computers, in-vehicle integrated computing devices, vehicular mobile radios, and any other computing device capable of being disposed in a vehicle and wiredly or wirelessly communicating with other computing devices. Furthermore, while a police vehicle is illustrated in FIG. 1A, other types of vehicles could be used as well, including but not limited to, national park vehicles, ambulances, helicopters, planes, drones, special weapons and tactics vehicles, mobile evidence labs, bicycles, motorcycles, and boats.

As set forth in FIG. 1B, a police officer 150 may include a personal computing device 152 for controlling a covert state of a police officer's 150 clothing 154 and propagating a covert mode status change to other devices. While a portable radio computing device is illustrated as the computing device 152 in the example set forth in FIG. 1B, in other embodiments, other types of computing devices could be used, including but not limited to a cellular phone, a tablet computer, a clothing-integrated computing device, a pair of smart glasses, a smart watch, and any other computing device capable of being disposed on or carried by a police officer and wiredly or wirelessly communicating with other computing devices. Furthermore, while a police officer is illustrated in FIG. 1B, other types of public safety personnel could take advantage of the disclosed embodiments as well, including but not limited to, national park officers, medics, special weapons and tactics personnel, evidence technicians, and service dogs or service horses. Still further, same or similar considerations as set forth above could be applied to public safety robots and drones, among other possibilities. Finally, while a hoodie is illustrated in FIG. 1B as the article of clothing 154, other articles of clothing could similarly be used, such as a button-up shirt, a hat, jeans, pants, shoes, or a vest, among other possibilities.

Figure 2A:
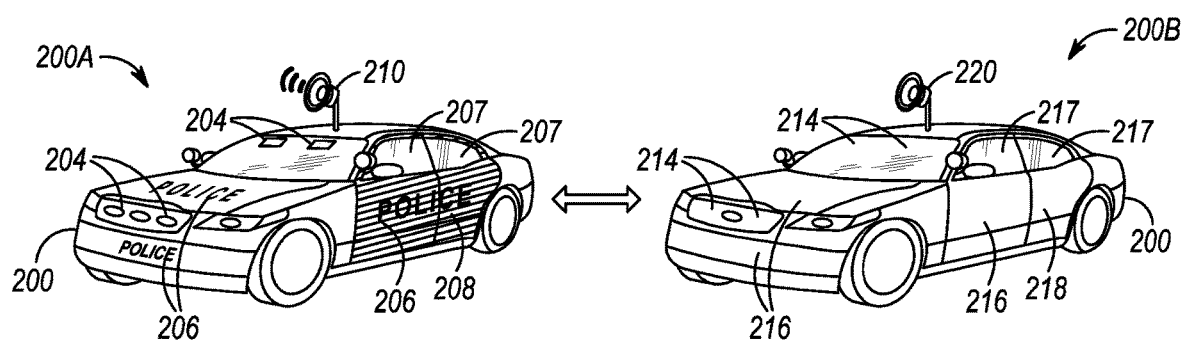
FIG. 2A is a system diagram illustrating externally-perceivable outputs of the police vehicle of FIG. 1A in accordance with some embodiments.
Figure 2B:
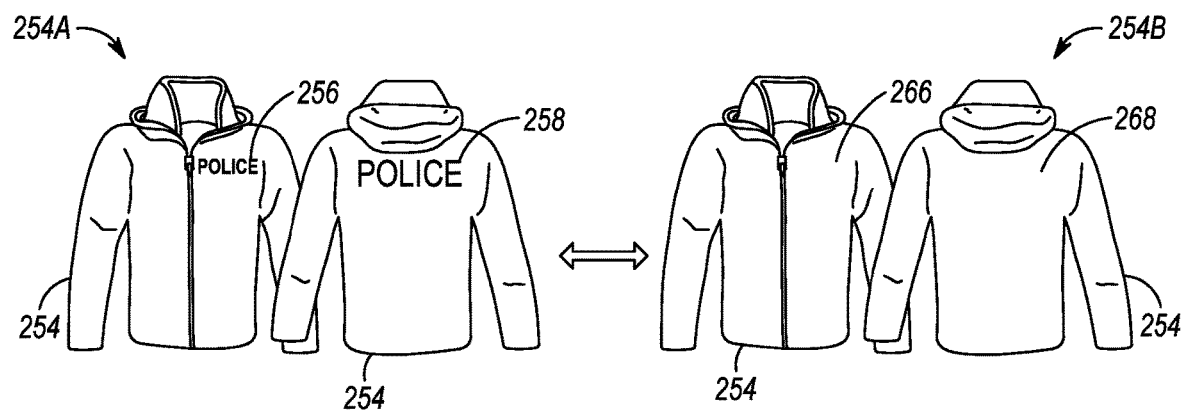
FIG. 2B is a system diagram illustrating externally-perceivable outputs of the police officer of FIG. 1B in accordance with some embodiments.

FIGS. 2A and 2B illustrate example externally-perceivable outputs of each of a police vehicle 200, which may be the same or similar to police vehicle 100 of FIG. 1A, and a police officer's clothing 254, which may be the same or similar to the police officer's clothing 154 of FIG. 1B. As set forth in FIG. 2A, a police vehicle 200 in a non-covert state 200A may include externally-perceivable outputs such as externally-perceivable visible flashing lights 204 that may rotate or strobe various colors of light at various rates, externally-perceivable visible text 206 that identifies the vehicle as a police vehicle or other type of public safety or law enforcement responder, externally-perceivable windows 207 that are un-dimmed, externally-perceivable colored panels 208 that are either colored to match a public safety or law enforcement responder color motif or may be used to enable a display of inverse externally-perceivable text 206 as illustrated in FIG. 2A, and a speaker or horn 210 that broadcasts an externally-perceivable audio output such as a public safety tone, series of tones, or spoken words that may be perceived by other officers, civilians, or suspects nearby. Other types of devices capable of producing externally-perceivable outputs could be added as well.

The externally-perceivable visible flashing lights 204 may include an underlying LED, incandescent, or halogen lamp whose light output is modulated into a strobe, rotating, blinking, or otherwise non-static output, and may comprise a white or colored (e.g., red, blue, etc.) light. The externally-perceivable text 206 (which may also be present on a roof of the vehicle or elsewhere) may be enabled via embedded displays such as light-emitted diode (LED) displays or a liquid crystal display (LCD), mechanically movable roll-signs or mechanically movable coverings that allow back-lights to shine through or ambient light to reflect to reveal the underlying text, light emitting phosphors that emit when an energy source such as radiation or electricity is applied, or any other type of switchable text display mechanism. The externally-perceivable colored panels 208 may be similarly configured. The externally-perceivable windows 207 may be electrochromic, photochromic, thermochromic, suspended particle, and/or polymer dispersed liquid crystal devices. The externally-perceivable speaker or horn 210 may be a loudspeaker, an emergency tone generator, a siren, a car horn, or some other acoustic generating device that can generate and output a perceivable audio signal such as a tone, music, speech, or other type of audio.

In contrast to the police vehicle 200 in a non-covert state 200A, a police vehicle 200 in a covert state 200B may include visible flashing lights 214 that are turned off or retracted, visible text 216 elements that are turned off, retracted, or covered, windows 217 that are dimmed, colored panels 218 that are either colored to match a plain color over the unmarked vehicle or turned off, and a speaker or horn 220 that is turned off, muted, or not driven. The visible flashing lights 214 may have a same or similar structure to the visible flashing lights 204 but are maintained in a different covert state, the visible text 216 elements may have a same or similar structure to the visible text 206 elements but are maintained in a different covert state, the windows 217 may have a same or similar structure to the windows 207 but are maintained in a different covert state, the colored panels 218 may have a same or similar structure to the colored panels 208 but are maintained in a different covert state, and the speaker 220 may have a same or similar structure to the speaker 210 but is maintained in a different state in covert mode compared to non-covert mode.

As set forth in FIG. 2B, a police officer's clothing 254 in a non-covert state 254A may include externally-perceivable outputs such as externally-perceivable text 256, 258 on respective front and rear sides (and/or other areas such as sleeves and lateral sides) of the clothing that identifies the wearer as a police officer or other type of public safety or law enforcement responder. Other types of devices capable of producing externally-perceivable outputs could be added as well, including but not limited to fabric speakers, among other possibilities. The externally-perceivable visible text 256, 258 may be enabled via embedded displays such as organic light-emitted diode (OLED) displays or other types of displays, light emitting phosphors that emit when an energy source such as radiation or electricity is applied, or any other type of switchable text display mechanism. In other embodiments, the externally-perceivable visible text 256, 258 may be enabled via underlying switchable and powered luminescent colored panels that are stitched over via fabric portions of the clothing 254 to form the text portions of the visible text 256, 258 when illuminated. Other possibilities exist as well.

In contrast to the police officer's clothing 254 in a non-covert state 254A as set forth in FIG. 2B, a police officer's clothing 254 in a covert state 254B may include text 266, 268 on respective front and rear sides of the clothing that are either actively set to a color to match a plain color of the plainclothes surrounding the text region or are switched off. The text 266, 268 elements may have a same or similar structure to the text 256, 258 elements but are maintained in a different covert state.

Figure 3:
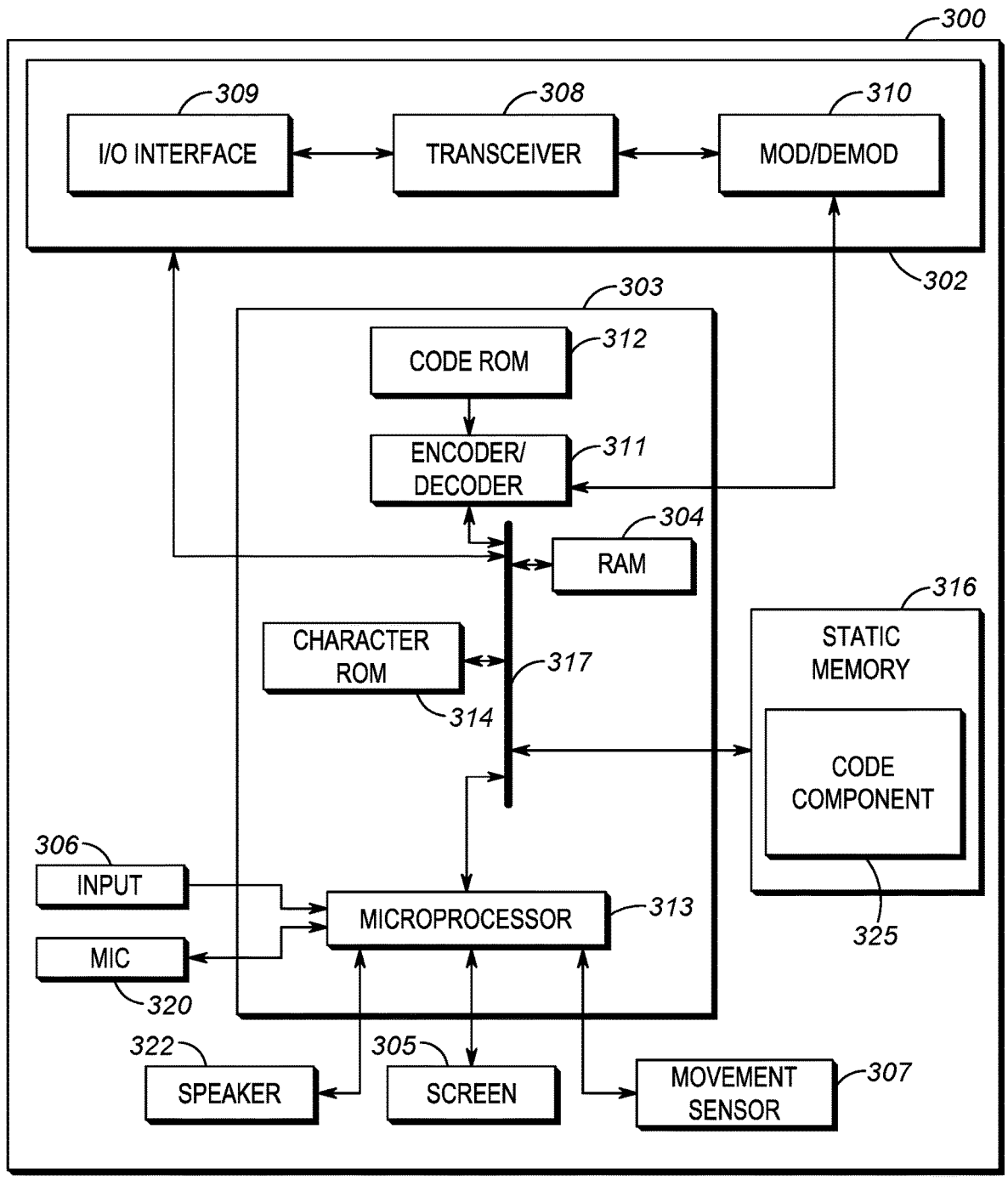
FIG. 3 is a device diagram showing a device structure of the computing devices of FIGS. 1A and 1B in accordance with some embodiments.

Referring to FIG. 3, a schematic diagram illustrates a computing device 300 according to some embodiments of the present disclosure. Computing device 300 may be, for example, the same as or similar to the automotive computing device 102 of FIG. 1A and/or the personal computing device 152 of FIG. 1B. As shown in FIG. 3, computing device 300 includes a communications unit 302 coupled to a common data and address bus 317 of a processing unit 303. The computing device 300 may also include an input unit (e.g., keypad, pointing device, etc.) 306 and a display screen 305, each coupled to be in communication with the processing unit 303. In some examples, computing device 300 may also include a movement sensor 307.

In some embodiments, a microphone 320 may capture audio from a user that is further vocoded by processing unit 303 and transmitted as voice stream data by communication unit 302 to other mobile or portable radios and/or other devices, and a communications speaker 322 may reproduce audio that is decoded from voice streams of voice calls received from other mobile or portable radios and/or from an infrastructure device via the communications unit 302.

The processing unit 303 may include a code Read Only Memory (ROM) 312 coupled to the common data and address bus 317 for storing data for initializing system components. The processing unit 303 may further include an electronic microprocessor 313 coupled, by the common data and address bus 317, to a Random Access Memory (RAM) 304 and a static memory 316.

The motion sensor 307 may include one or more movement sensors (such as an accelerometer, magnetometer, and/or gyroscope) that may periodically or intermittently provide to the microprocessor 313 indications of orientation, direction, steps, acceleration, and/or speed, perhaps accompanying other additional information, as PCIEs. An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well.

The communications unit 302 may include one or more wired or wireless input/output (I/O) interfaces 309 that are configurable to communicate with devices having switchable externally-perceivable outputs, with other mobile or portable radios, and/or with other types of accessory devices.

The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 302 may additionally or alternatively include one or more wireline transceivers 308, such as an Ethernet transceiver, a Universal Serial Bus (USB) transceiver, a Tip, Ring, Sleeve (TRS) connection, a Tip, Ring, Ring, Sleeve (TRRS) connection, or similar transceiver configurable to communicate via a twisted pair wire, a coaxial cable, a fiber-optic link, an audio jack, or a similar physical connection to a wireline network. The transceiver 308 is also coupled to a combined modulator/demodulator 310.

The microprocessor 313 has ports for coupling to the input unit 306 and the microphone unit 320, and to the display screen 305 and speaker 322. Static memory 316 may store operating code for the microprocessor 313 that, when executed, performs one or more of the triggering and covert mode status change propagation steps set forth in FIG. 5 and accompanying text. Static memory 316 may also store, permanently or temporarily, triggering rules disclosed herein as determining when to trigger a covert mode status change.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 4:
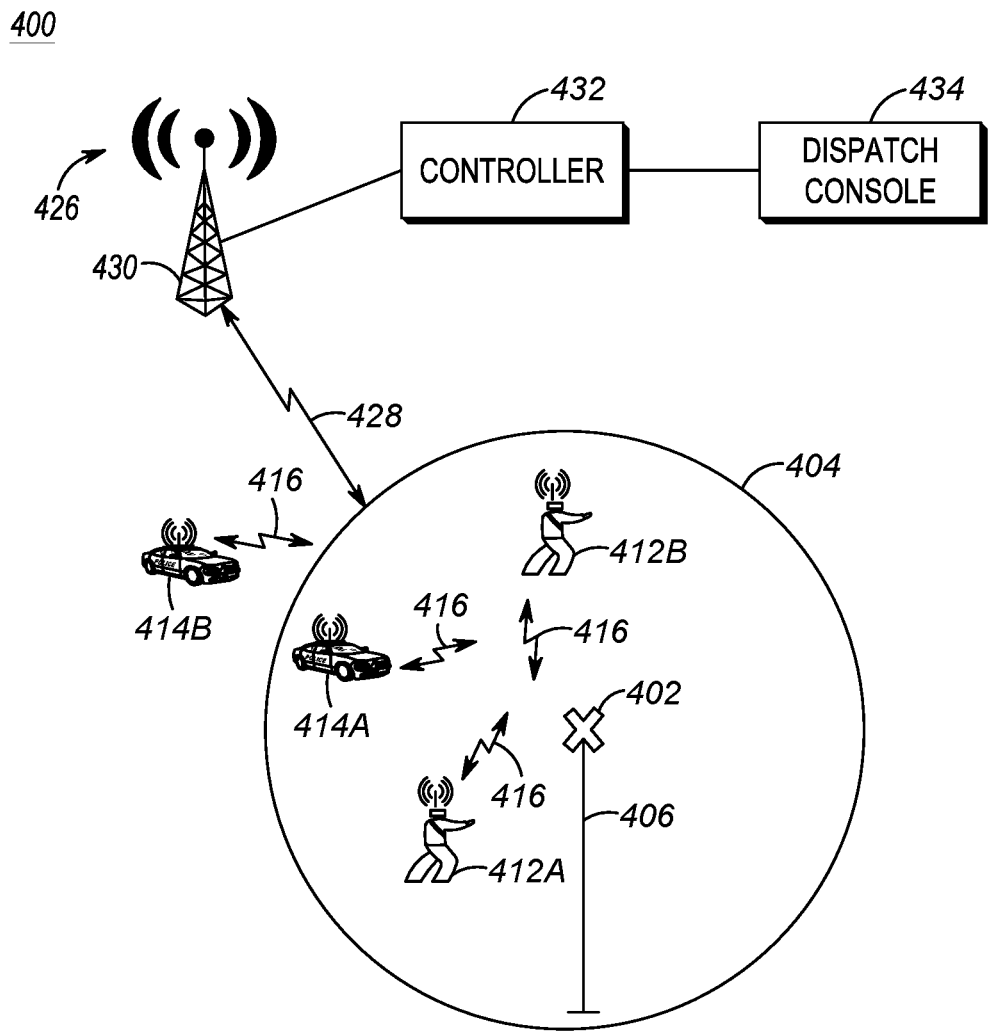
FIG. 4 is a plan view of an example incident scene in which the process steps of FIG. 5 may be executed in accordance with some embodiments.

FIG. 4 sets forth an example incident/response area 400 that may have a defined incident location 402 and may have a geofenced response boundary 404 defined at a static or variable distance 406 from the defined incident location 402. Various potential vehicular and police officer responders (each of which may already be a member of a corresponding incident response group, such as police and/or traffic control) may already be on scene at the defined incident location 402 or within the geofenced response boundary 404 at the time of the incident. Each potential responder may be a person or vehicle, or other responder type, with an associated computing device (e.g., portable or mobile radio) capable of communicating wiredly or wirelessly with each other and/or with a RAN 426, and each computing device also having control over one or more corresponding devices having an externally-perceivable output.

As illustrated in FIG. 4, such potential responders may include, for example, first and second responding police officers 412A, 412B (e.g., an officer operating on-foot) and first and second responding police vehicles 414A, 414B. Each of the first and second responding police vehicles 414A, 414B may be the same or similar to the police vehicles 200 of FIG. 2A and 100 of FIG. 1A and each of the first and second responding police officers 412A, 412B may be the same or similar to the police officer 150 of FIG. 1B wearing a same or similar clothing 254 set forth in FIG. 2B.

Each of the police officers and/or police vehicles 412A, 412B, 414A, 414B may, in one example, already be actively using RF resources 428 of the RAN 426. RAN 426 may implement over RF resources 428 wireless links that, for example, enable a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 426 may additionally or alternatively implement over RF resources 428 wireless links that, for example, enable a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. Other types of wireless protocols could be implemented as well. The RAN 426 is illustrated in FIG. 4 as providing coverage substantially throughout the incident/response area 400, illustrated in FIG. 4 as including a single fixed terminal 430 coupled to a controller 432 (e.g., radio controller, call controller, PTT server, zone controller, MME, BSC, MSC, site controller, Push-to-Talk controller, or other network device) and including a dispatch console 434 operated by a dispatcher. Accordingly, each of the police officers and/or police vehicles 412A, 412B, 414A, 414B could communicate with one another via the RAN 426, or via ad-hoc or direct mode communications links 416. In still other examples, other types of responders may communicate with one another via infrastructure or ad-hoc wired communication connections.

In some embodiments, the police officers 412A, 412B may communicate on one talkgroup while the police vehicles 414A, 414B communicate on another talkgroup, while in other embodiments, they may all communicate on a same talkgroup. The defined geofenced response boundary 404 in FIG. 4 may be set by one of the responders in the field or by the dispatcher at the dispatch console 434, and may act as a geofence for triggering a covert mode status change upon an officer, vehicle, or other user or device entering or exiting the geofenced area, among other possibilities.

For example, an incident occurring at the defined incident location 402 may be or include a robbery in progress, a planned drug bust, or a mob action. In general, different types of crimes require different types of approaches. For example, in a case such as a planned drug bust where the arriving officers and vehicles may want to maintain a covert state until the last possible second in order to avoid tipping off one of the participants in a transaction. In a different case such as a mob action, the arriving officers and vehicles may want to maintain a non-covert state in order to provide a visual deterrent to the mob action. In some cases, circumstances may change throughout an incident such that changes in incident context may trigger a change in strategy requiring a change from a covert state to a non-covert state or vice versa or perhaps back again, among other possible permutations.

2. Processes for Triggering and Propagating a Covert Mode Status Change

Figure 5:
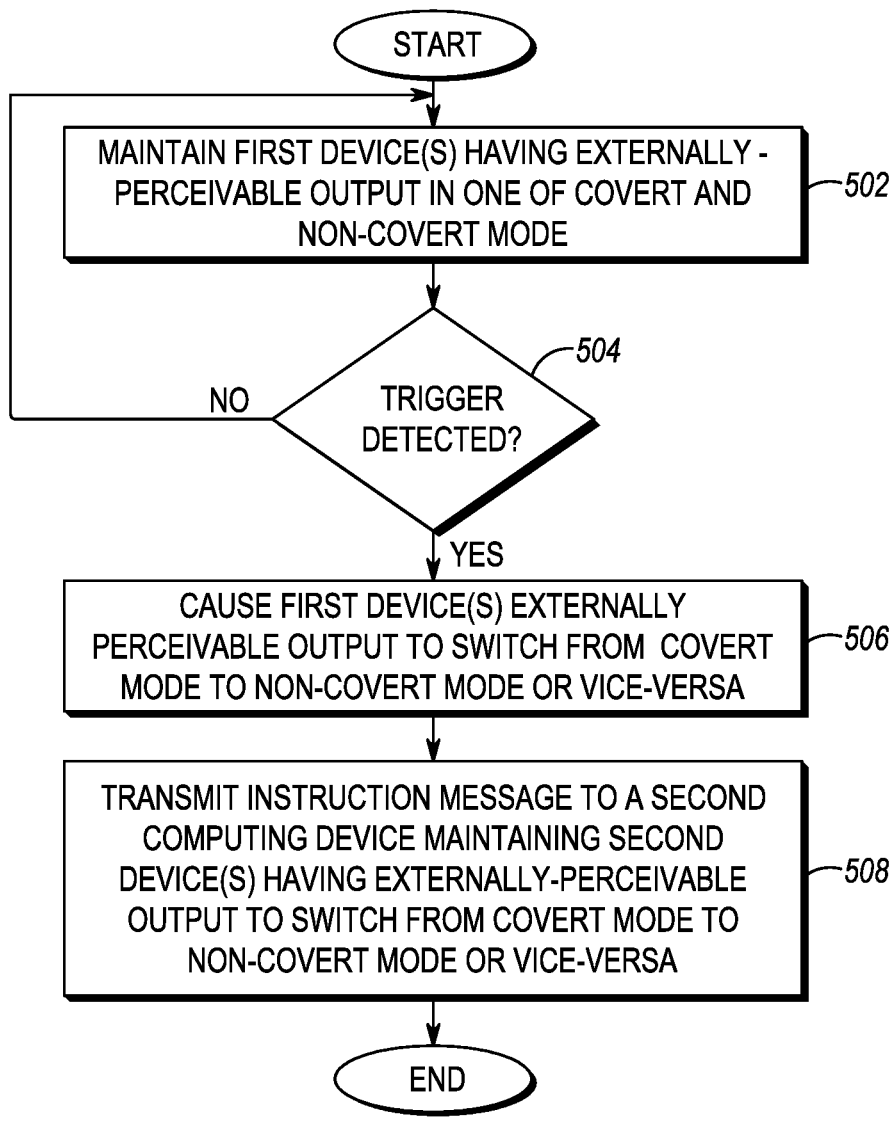
FIG. 5 illustrates a flow chart setting forth process steps for triggering and propagating a covert mode status change among other devices in accordance with some embodiments.

Turning now to FIG. 5, a flow chart sets forth process a process 500 for triggering and propagating a covert mode status change among other devices. Process 500 begins at step 502, where a computing device maintains one or more first devices, each having an externally-perceivable output, in one of a covert mode in which indications of law enforcement activity are caused to be hidden or inactivated via the externally-perceivable output and a non-covert mode in which the one or more indications of law enforcement activity are caused to be revealed or activated via the externally-perceivable output. For example, this may include the police officer's portable radio computing device 152 of FIG. 1B maintaining, via a wired or wireless connection, an externally-perceivable visible text 256, 258, 266, 268 device on respective front and rear sides of the officer's clothing 254 in one of a covert state (deactivated or otherwise matching the plain clothes of the officer to conceal the wearer's membership in a law enforcement organization) and a non-covert state (enabled to display text or other graphics or colors identifying the wearer's membership in a law enforcement organization and providing a deterrent effect). In another example, this may include the police vehicle's mobile radio computing device 102 of FIG. 1A controlling, via a wired or wireless connection, an externally-perceivable visible text 206, 216 on respective front and sides of the police vehicle 100 in one of a covert state (deactivated or otherwise matching the color of the surrounding portions of the vehicle to conceal the vehicle's association with a law enforcement organization) and a non-covert state (enabled to display text identifying the vehicle as associated with a law enforcement organization and providing a deterrent effect). In other embodiments, instead of the externally-perceivable outputs being communicably coupled to the computing device via a wired and/or wireless connection, the externally-perceivable outputs may be physically integrated with the computing device (e.g., as externally visible portions of the computing device housing) and coupled to a processor of the computing device via internal wiring traces, among other possibilities.

In one embodiment, the computing device having one or more devices each having externally-perceivable outputs may operate in a default covert state based on a type of officer or vehicle (beat cop and corresponding vehicle, traffic control and corresponding vehicle, detective and corresponding vehicle, commander and corresponding vehicle, etc.) or a policy of the organization with which the officer or vehicle is associated. For example, computing devices associated with beat cops or traffic control officers may default to maintaining its one or more devices each having externally-perceivable outputs in a non-covert state in order to provide a deterrent effect as the officer or vehicle patrols a beat or drives to/from an assigned traffic control point. In another example, computing devices associated with detectives or commanders may default to maintaining their one or more devices each having externally-perceivable outputs in a covert state in order to provide more discretion during their investigations. These default states may then change in response to a detected covert mode status change trigger.

At step 504, the computing device may detect a covert mode status change trigger, which may be a covert mode trigger (e.g., a trigger indicating a change should be made from a non-covert state to a covert state) or a non-covert mode trigger (e.g., a trigger indicating a change should be made from a covert state to a non-covert state). The trigger detected at step 504 may be an internally generated trigger, i.e., generated at the computing device itself based on some logic as a function of a determined context of the computing device (or a user or vehicle associated with the computing device), or may be an externally generated trigger, i.e., generated at some other computing device and received at the computing device via an I/O interface such as the I/O interface 309 of computing device 300 of FIG. 3.

In one example, an internally generated covert mode trigger or non-covert mode trigger may be generated by the computing device detecting a first change in context, such as detecting that it has passed into or passed out of a geofenced area associated with a particular incident. For example, and in reference to FIG. 4, as the police vehicle 414B moves toward the defined incident location 402 it may pass the geofenced response boundary 404 set up by a dispatcher at dispatch console 434 or by one of the police officers 412A, 412B already at/near the defined incident location 402. Based on a type of incident occurring at the defined incident location 402 and communicated to the computing device, or based on an indication of whether the geofenced area associated with the geofenced response boundary 404 is associated with a covert-mode area or a non-covert mode area (information similarly provided to the computing device along with the geofence definition), the police vehicle 414B may generate one of a covert mode trigger and a non-covert mode trigger when it determines it has crossed the geofenced response boundary 404 and into the geofenced area defined by the geofenced response boundary 404 (e.g., by comparing its own determined GPS or triangulated location with the received geofence definition). Which one of the covert mode trigger and the non-covert mode trigger is raised may depend on the trigger identified as being associated with the geofenced response boundary 404 and provided to the computing device, or may depend on the particular type of incident identified as occurring at the defined incident location 402 location and provided to the computing device, perhaps cross-referenced by the computing device with a locally-maintained or remotely accessed database that maps types of incidents to whether the arriving police vehicle or police officer should be maintained in a covert state or non-covert state. When detecting that it is passing out of the geofenced area, the officer or vehicle's computing device may cause the externally-perceivable outputs to return to (or remain in) their default covert state.

In another example, the internally generated covert mode trigger or non-covert mode trigger may be generated by the computing device detecting a second change in context such as detecting that it, or a radio communication device associated with it, has changed talkgroup channels. For example, and in reference to FIG. 4, one of the police officers 412A may be carrying a portable radio such as the computing device 152 set forth in FIG. 1 (and which may also serve as the computing device 300 for controlling externally-perceivable outputs associated with the police officer 412A), and the police officer in possession of the portable radio computing device 152 may change a talkgroup channel of the portable radio computing device 152 via an external knob or other input mechanism. Which one of the covert mode trigger and the non-covert mode trigger is raised based on the talkgroup channel change may depend on the original talkgroup selection and/or the new talkgroup selection, each of which may be cross-referenced with a locally-maintained or remotely accessed database that maps talkgroup channels with an assigned current covert state. If the original talkgroup selection is currently associated with a covert state and the new talkgroup selection is currently associated with a non-covert state, a non-covert mode trigger may be raised by the portable radio computing device 152. If, on the other hand, the original talkgruop selection is currently associated with a non-covert state and the new talkgroup selection is currently associated with a covert state, a covert mode trigger may be raised by the portable radio computing device 152. In some embodiments, a level of hysteresis may be applied to the talkgroup selection, e.g., requiring that a talkgroup be selected for greater than a minimum period of time before executing a covert state change associated with the talkgroup selection, such as greater than or equal to 1 s, 5 s, or 10 s.

In still further embodiments, the portable radio computing device 152 may be configured to periodically request updated mappings and/or periodically receive updated mappings of talkgroup covert states (via its I/O interface or via an input interface, for example), and upon detecting a change in state of a current talkgroup (even without changing talkgroups), raise one of a covert mode trigger and a non-covert mode trigger. Similar actions may be taken by a vehicular mobile radio computing device 102 operating in a police vehicle 100, among other devices and other possibilities.

In a still further example, the internally generated covert mode trigger or non-covert mode trigger may be generated by the computing device detecting a change in context via one or more other devices communicatively coupled to the computing device via a personal area network (PAN), vehicle area network (VAN), local area network (LAN), wide-area-network (WAN), ad-hoc network (AHN), or disruption tolerant network (DTN). For example, a holster sensor (not shown) associated with the officer 150 of FIG. 1B and communicatively coupled to the portable radio computing device 152 may detect an unholstering of a weapon, and transmit a signal to the portable radio computing device 152 (via a wired and/or wireless link) to the portable radio computing device 152 indicative of the sensed unholstering. On receipt of the unholstering signal, the portable radio 152 may determine that a local context of the police officer 150 has changed, and may internally generate a non-covert mode trigger to reveal the user as a police officer and provide an increased deterrent effect. Other externally generated context change signals could be received at the portable radio 152 as well, including biometric information associated with a physical health state of the police officer 150, orientation information associated with an orientation and/or speed of action or speed of orientation change of the police officer 150 that may be indicative of an altercation or life-threatening situation, and a threshold number of other officers (in a covert or non-covert status) that are detected to be within a threshold distance of the police officer 150, among other possibilities.

For a computing device such as automotive computing device 102 in police vehicle 100, context information may include whether a suspect is seated in a rear of the vehicle, a speed or acceleration of the vehicle, a state of any one or more doors or trunks of the vehicle, a number of officers nearby the vehicle or a number of other police vehicles near the vehicle, and a state of a siren or light switch of the vehicle, among other possibilities.

In other embodiments, the covert mode status change trigger detected at step 504 may be an externally generated trigger received at the computing device in a covert mode status change trigger message via an I/O interface of the computing device such as the I/O interface 309 of the computing device 300 of FIG. 3. In one example, and with reference to FIG. 4, a dispatcher at dispatch console 434 may cause a covert mode status change trigger message to be generated and transmitted to the computing device via fixed terminal 430 base station and RF resources 428. In still another example, another device such as police vehicle 414A may generate a covert mode status change trigger message and may transmit (e.g., broadcast, multicast, or unicast) the message to other nearby devices via the RAN 426 or via ad-hoc or direct mode communications links 416. In some embodiments where the detected trigger is externally generated, the computing device may determine a relative rank or priority of a user and/or device that generated the external trigger message, and may refrain from making the covert state change indicated and relaying the trigger message on to other devices if the determined relative rank is lower than a predetermined threshold rank or priority, and/or is lower than their current rank or priority of the receiving device or officer associated therewith. In those circumstances, for example, the receiving computing device may wait for a confirmation covert mode status change message to be transmitted from someone with a higher rank or priority, and only upon receipt of the confirmation message then make a local covert mode state change and further propagate the covert mode status change message to other devices.

If no covert mode status change trigger is detected by the computing device at step 504, processing returns to step 502. If, on the other hand, a covert mode status change trigger is detected by the computing device at step 504, processing proceeds to step 506, where the computing device causes the one or more externally-perceivable outputs of devices under its control to switch from the covert state to the non-covert state when the covert mode status change trigger is a non-covert mode trigger and causes the one or more externally-perceivable outputs of devices under its control to switch from the non-covert state to the covert state when the covert mode status change trigger is a covert mode trigger. For example, the computing device may cause externally perceivable outputs of a police vehicle to make one of the transitions already set forth above with respect to FIG. 2A or may cause externally perceivable outputs of a police officer's clothing to make one of the transitions already set forth above with respect to FIG. 2B. In some embodiments, instead of automatically and immediately making the covert mode state change locally, the computing device may first initiate a prompt to a user (wearer of the clothing, driver of the vehicle, etc.) requesting confirmation to make the covert state change indicated by the detected covert mode status change trigger. Only after receiving confirmation from the user and/or driver via the computing device, perhaps via an input interface such as that input interface 306 of the computing device 300 of FIG. 3, would the computing device then execute steps 506 and 508.

In addition, and still responsive to detecting the covert mode status change trigger at step 504, at step 508, the computing device wiredly or wirelessly relays (e.g., transmits) a covert mode status change message to one or more second computing devices each maintaining one or more second devices each having a second externally-perceivable output to one of switch from the covert state to the non-covert state when the non-covert mode trigger is detected and switch from the non-covert state to the covert state when the covert mode trigger is detected. The computing device may transmit the covert mode status change message to the one or more second computing devices via one or more of a PAN, a VAN, a LAN, a WAN, an AHN, or a DTN communicatively coupled to the computing device. The second computing devices may then change their covert state or make their own determination of whether to change their covert state, and further pass along the covert mode status change message to other third computing devices.

3. Conclusion

In accordance with the foregoing, an improved method, device, and system for triggering a covert mode status change and propagating the covert mode status change among other devices is disclosed. As a result of the foregoing, a covert state of a large number of officers, vehicles, and other users and devices can be synchronized. For example, a commander or other person on scene and in possession of sufficient information to believe that a covert state should be changed can cause all nearby vehicles, officers, and other users and devices to change their state as well simply by changing their own covert state, greatly simplifying the process and increasing a safety and security of first responders. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for triggering and propagating a covert mode status change, the method comprising:
   maintaining, by a computing device, one or more first devices each having an externally-perceivable output in one of a covert state in which one or more indications of law enforcement activity are caused to be hidden or inactivated via the externally-perceivable output and a non-covert state in which the one or more indications of law enforcement activity are caused to be revealed or activated via the externally-perceivable output;
   detecting, by the computing device, a covert mode status change trigger and in response to detecting the covert mode status change trigger:
      one of causing, by the computing device, the one or more externally-perceivable outputs to switch from the covert state to the non-covert state when the covert mode status change trigger is detected and causing, by the computing device, the one or more externally-perceivable outputs to switch from the non-covert state to the covert state when the covert mode status change trigger is detected; and
      transmitting, by the computing device via one or more of a personal area network (PAN), vehicle area network (VAN), local area network (LAN), wide-area-network (WAN), ad-hoc network (AHN), or disruption tolerant network (DTN) communicatively coupled to the computing device, a covert mode status change trigger message to a second computing device maintaining one or more second devices each having a second externally-perceivable output to one of switch from the covert state to the non-covert state and switch from the non-covert state to the covert state.

2. The method of claim 1, further comprising causing, by the computing device, the one or more externally-perceivable outputs to switch from the covert state to the non-covert state when the covert mode status change trigger is detected.

3. The method of claim 1, further comprising causing, by the computing device, the one or more externally-perceivable outputs to switch from the non-covert state to the covert state when the covert mode status change trigger is detected.

4. The method of claim 1, wherein the externally-perceivable output of each of the one or more first devices is an externally visible surface switchable between a non-covert state in which law-enforcement identifying text is visible and a covert state in which law-enforcement identifying text is not visible.

5. The method of claim 1, wherein the externally-perceivable output of each of the one or more first devices is an audio output switchable between a non-covert state in which law-enforcement identifying audio is played back and a covert state in which law-enforcement identifying audio is not played back.

6. The method of claim 1, wherein the detecting the covert mode status change trigger comprises detecting, by the computing device, that the computing device has entered into or exited from a geofenced area associated with one of a covert mode area and a non-covert mode area.

7. The method of claim 1, wherein the detecting the covert mode status change trigger comprises detecting, by the computing device, a change in talkgroup associated with the computing device.

8. The method of claim 1, wherein the detecting the covert mode status change trigger comprises detecting, by the computing device, a change in context of a user or vehicle associated with the computing device or a change in context of the computing device.

9. The method of claim 8, wherein the change in context comprises one or more of a detected unholstering of a weapon associated with the user, a speed of a vehicle associated with the computing device, and a number of officers nearby the computing device, user, or vehicle rising above a threshold level.

10. The method of claim 1, wherein detecting the covert mode status change trigger comprises receiving, via a transceiver, a separate covert mode status change trigger message.

11. The method of claim 1, wherein detecting the covert mode status change trigger comprises the computing device detecting an internally generated trigger.

12. The method of claim 1, wherein transmitting the covert mode status change trigger message comprises transmitting the message via one of the PAN and the VAN.

13. The method of claim 1, wherein the one or more first devices are physically integrated with the computing device.

14. The method of claim 1, wherein the one or more first devices are separate from the computing device but wiredly or wirelessly communicably coupled to the computing device.

15. A computing device for triggering and propagating of a covert mode status change, the device comprising:
one or more transceivers communicatively coupled to one or more of a personal area network (PAN), vehicle area network (VAN), local area network (LAN), wide-area-network (WAN), ad-hoc network (AHN), or disruption tolerant network (DTN);
a data store; and
one or more electronic processors configured to:
maintain one or more first devices each having an externally-perceivable output in one of a covert state in which one or more indications of law enforcement activity are caused to be hidden or inactivated via the externally-perceivable output and a non-covert state in which the one or more indications of law enforcement activity are caused to be revealed or activated via the externally-perceivable output;
detect a covert mode status change trigger and in response to detecting the covert mode status change trigger:
one of cause the one or more externally-perceivable outputs to switch from the covert state to the non-covert state when the covert mode status change trigger is detected and cause the one or more externally-perceivable outputs to switch from the non-covert state to the covert state when the covert mode status change trigger is detected; and
transmit, via the one or more transceivers, a covert mode status change trigger message to a second computing device maintaining one or more second devices each having a second externally-perceivable output to one of switch from the covert state to the non-covert state and switch from the non-covert state to the covert state.

16. The computing device of claim 15, wherein the externally-perceivable output of each of the one or more first devices is an externally visible surface switchable between a non-covert state in which law-enforcement identifying text is visible and a covert state in which law-enforcement identifying text is not visible.

17. The computing device of claim 15, the one or more electronic processors further configured to detect the covert mode status change trigger by detecting that the computing device has entered into or exited from a geofenced area associated with one of a covert mode area and a non-covert mode area.

18. The computing device of claim 15, the one or more electronic processors further configured to detect the covert mode status change trigger by detecting a change in talkgroup associated with the computing device.

19. The computing device of claim 15, the one or more electronic processors further configured to detect the covert mode status change trigger by detecting a change in context of a user or vehicle associated with the computing device or a change in context of the computing device.

20. A non-transitory computer readable media storing instructions that, when executed by a processor, perform a set of functions for triggering and propagating of a covert mode status change, the set of functions comprising:
maintaining one or more first devices each having an externally-perceivable output in one of a covert state in which one or more indications of law enforcement activity are caused to be hidden or inactivated via the externally-perceivable output and a non-covert state in which the one or more indications of law enforcement activity are caused to be revealed or activated via the externally-perceivable output;
detecting a covert mode status change trigger and in response to detecting the covert mode status change trigger:
one of causing the one or more externally-perceivable outputs to switch from the covert state to the non-covert state when the covert mode status change trigger is detected and causing the one or more externally-perceivable outputs to switch from the non-covert state to the covert state when the covert mode status change trigger is detected; and
transmitting, via one or more of a personal area network (PAN), vehicle area network (VAN), local area network (LAN), wide-area-network (WAN), ad-hoc network (AHN), or disruption tolerant network (DTN) communicatively coupled to the computing device, a covert mode status change trigger message to a second computing device maintaining one or more second devices each having a second externally-perceivable output to one of switch from the covert state to the non-covert state and switch from the non-covert state to the covert state.

* * * * *